United States Patent [19]

Loreth et al.

[11] Patent Number: 5,180,404
[45] Date of Patent: Jan. 19, 1993

[54] CORONA DISCHARGE ARRANGEMENTS FOR THE REMOVAL OF HARMFUL SUBSTANCES GENERATED BY THE CORONA DISCHARGE

[75] Inventors: Andrzej Loreth, Akersberga; Vilmos Török, Lidingö both of Sweden

[73] Assignee: Astra-Vent AB, Sweden

[21] Appl. No.: 690,899

[22] PCT Filed: Nov. 29, 1989

[86] PCT No.: PCT/SE89/00690
§ 371 Date: Jun. 10, 1991
§ 102(e) Date: Jun. 10, 1991

[87] PCT Pub. No.: WO90/06180
PCT Pub. Date: Jun. 14, 1990

[30] Foreign Application Priority Data

Dec. 8, 1988 [SE] Sweden .................................. 8804447

[51] Int. Cl.⁵ .................................................. B03C 3/14
[52] U.S. Cl. ......................................... 55/117; 55/124; 55/136; 55/151; 315/111.91
[58] Field of Search .................. 55/117, 120, 136, 151, 55/124, 126; 315/111.91

[56] References Cited

U.S. PATENT DOCUMENTS

| | | | |
|---|---|---|---|
| 3,239,130 | 3/1966 | Naundorf, Jr. | 315/111.91 |
| 3,374,941 | 3/1968 | Okress | 315/1111.91 |
| 3,526,828 | 9/1970 | Whitby | 55/117 X |
| 4,380,720 | 4/1983 | Fleck | 315/111.91 |
| 4,588,423 | 5/1986 | Gillingham et al. | 55/117 |
| 4,812,711 | 3/1989 | Torok et al. | 261/DIG. 42 |
| 4,861,356 | 8/1989 | Penney | 55/117 X |
| 4,955,991 | 9/1990 | Torok et al. | 55/120 |
| 5,006,761 | 4/1991 | Torok et al. | 261/DIG. 42 |
| 5,012,159 | 4/1991 | Torok et al. | 315/111.91 |
| 5,024,685 | 6/1991 | Torok et al. | 55/117 |

Primary Examiner—Richard L. Chiesa

[57] ABSTRACT

A corona discharge apparatus includes a corona electrode (K) and a target electrode (M) which is spaced from the corona electrode (K). The electrodes are connected to a d.c. source (2) having a voltage such as to produce a corona discharge on the corona electrode. For the purpose of removing the harmful or irritating gaseous substances generated by the corona discharge, there is provided a suction channel (4), which has an inflow opening or orifice (4a) located in the immediate vicinity of the corona electrode (K). The remainder of the suction channel is delimited in relation to the space (1) housing the corona electrode and the target electrode. Mounted in the suction channel (4) or at a location adjacent the channel opening (4a) is an additional electrode (E), which is connected to an d.c. potential which, in relation to the potential of the corona electrode (K), has the same polarity as the potential of the target electrode (M), so that an ion current will occur from the corona electrode (K) to the additional electrode (E), and therewith give rise to an airflow (8) past the corona electrode (K) and into the suction channel (4), through the channel opening (4a).

12 Claims, 4 Drawing Sheets

CORONA DISCHARGE ARRANGEMENTS FOR THE REMOVAL OF HARMFUL SUBSTANCES GENERATED BY THE CORONA DISCHARGE

FIELD OF THE INVENTION

The present invention relates to an improvement in corona discharge arrangements for removing and rendering harmless the potentially harmful gaseous products, in particular ozone and nitrogen oxides, that are produced by a corona discharge.

BACKGROUND OF THE INVENTION

A corona discharge arrangement of the kind to which the present invention pertains consists, in principle, of at least one corona electrode and at least one target electrode. The corona and target electrodes are spaced apart, and each of the electrodes is connected to a respective pole of a d.c. source, and the configuration of the corona electrode and the pole voltage of the d.c. source are such as to generate a corona discharge on the corona electrode. This corona discharge results in the generation of electrically charged air-ions of the same polarity as the corona electrode, and the air-ions migrate towards the target electrode, under the influence of the electric field, where they surrender their electric charge.

Corona discharge arrangements of the principle construction are found in many different forms in practice and are used for many different purposes. For example, corona discharge arrangements of this kind are used to a significant extent in air-purifying electrostatic precipitators. In this case, the air ions generated by the corona discharge are operative to charge electrically the contaminants, particles and/or liquid droplets, present in the air in the form of aerosols. These electrically charged impurities are extracted from the air, by being attracted to and bound on collecting surfaces of opposite polarity. Corona discharge arrangements of this kind are also used in air-transportation systems in which air flows are driven with the said of so-called electric ion or corona wind. Various different designs of such air transportation systems are found described in the literature, for instance in international patent applications PCT/SE85/00538, PCT/SE86/00548, PCT/SE87/00595 and PCT/SE88/00365 respectively now U.S. Pat. No. 4,812,711, U.S. Pat. No. 5,006,761, U.S. Pat. No. 5,024,685 and U.S. Ser. No. 07/438,427 now U.S. Pat. No. 5,012,159. Corona discharge arrangements of similar principle construction are also used in various other apparatus, as for instance electrostatic copying machines and laser printers.

A well known and not-readily solved problem encountered with the use of such corona discharge arrangements in spaces or locations in which people are to be found, for instance in dwellings or working places, and also in ventilation systems and air treatment systems which communicate with such spaces or locations, is that the corona discharge will generate chemical compounds, primarily ozone and nitrogen oxides, which are liable to cause an irritating effect and which may even be harmful to people when the compounds are present in excessive quantities. It is also known that a corona discharge will give rise to strong and unpleasant odors, which persist even subsequent to termination of the corona discharge process and subsequent to dispersal of the ozone generated by said process. The nature of these odorous gaseous substances is not known at present, although it is reasonable to assume that they occur as a result of chemical changes in airborne organic compounds in the highly reactive plasma layer of the corona discharge. The odorous substances generated by the discharge may therefore be potentially very harmful.

All of the undesirable, initiating or harmful substances are created in the immediate vicinity of the corona electrode and spread to the ambient air. The substances are produced at a rate which is contingent on the size of the electric corona current, and much higher levels of contaminating substances are produced by a negative corona discharge than by a positive corona discharge. The problem still exists, however, in the case of positive corona discharges. This generation of harmful or irritating substances has seriously limited the possibilities of using corona discharge arrangements in populated environments and has meant that the corona current used with such arrangements must be restricted. This limitation of the size of the corona current used, however, is in conflict with the intended purpose of such corona discharge arrangements, to wit the generation of a large number of electrically charged air-ions.

One solution to this problem is described in international patent application PCT/SE87/00183, according to which the air located in the immediate vicinity of the corona electrode and carrying the undesired, harmful substances, is removed continuously, e.g. by suction, through a tubular channel element which has an inflow orifice located in the immediate vicinity of the corona electrode and through which the contaminated air removed from the vicinity of the electrode is passed either to an air-filtering arrangement, in which the air is cleansed of its contaminant content, e.g. with the aid of sorbents, or alternatively to a location at which the air and the substances carried thereby can be released safely to the surroundings, i.e. to the open air. This solution to the problem in question is correct in principle and can also be applied in practice It is proposed in the aforesaid international patent application that the requisite flow of air passed the corona electrode and into the suction channel is generated with the said of a fan, an air pump or some corresponding device connected to the suction channel. One drawback with this solution, however, is that the provision of a fan, an air pump or the like for this purpose is both cost and space demanding, besides which the presence of such a fan, air pump etc., will add significantly to the noise generated by the system as a whole. It is also suggested in the aforesaid international patent application that the contaminated air could conceivably be guided through the inflow orifice of the suction channel with the said of air which already flows past the corona electrode and target electrode of the corona discharge arrangement, this airflow being sustained, for instance, by an external existing fan or being generated by the ion wind which flows from the corona electrode to the target electrode, and thus obviates the need for connecting a separate fan, air pump or corresponding device to the suction channel. This solution, however, requires the inflow orifice of the suction channel to be located immediately downstream of the corona electrode, as seen in the direction of the prevailing airflow, and also very close to the corona electrode, which in many instances would require an unacceptable structural configuration of the corona discharge arrangement.

Generally speaking, in order to be able to remove through the suction channel a significant proportion of the harmful substances generated by the corona discharge, it is necessary for the airflow carrying the contaminating substances to pass very close to the corona electrode and from there rapidly through the inflow orifice and into said suction channel, since these contaminating substances are generated in the close proximity of the corona electrode and tend to disperse rapidly in the ambient air. In many cases, it is found that this is difficult to achieve in practice at the level of efficiency desired, when practicing the method described in the aforesaid international patent application. It has also been found that the end of the suction channel, or tube, located in the close proximity of the corona electrode has, in many instances, an unfavourable screening and disturbing effect on the corona electrode, such as to make it difficult to produce and sustain the desired corona discharge without increasing the voltage difference between the corona and target electrodes or reducing the distance between these electrodes. Such increases in voltage difference or reductions in the distance between the electrodes, however, are not desirable, since the general endeavour is to produce the largest possible ion flow from corona electrode to target electrode with the said of the lowest possible voltage and with significant spacing between the corona and target electrodes. This latter criterium is particularly important when the corona discharge arrangement is used to drive airflows with the said of so-called ion wind.

SUMMARY OF THE INVENTION

Consequently, the object of the present invention is to provide an improved arrangement for recovering and rendering harmless the deleterious substances that are generated by the corona discharge of a corona discharge arrangement, this improved arrangement being based on the principle described in the international patent application PCT/SE87/00183, according to which the air present in the immediate vicinity of the corona electrode and carrying said harmful substances is removed continuously by suction, and which provides an effective solution to the aforediscussed problem that remains when practicing this known technique.

This object is achieved with the inventive arrangement defined in the following claims.

In accordance with the present invention, an additional electrode is mounted either within the suction channel or at a location adjacent the inflow orifice of the channel located in the proximity of the corona electrode, and the additional electrode is connected to a potential which, in relation to the potential of the corona electrode, has the same polarity as the polarity of the target electrode. This arrangement results in the migration of air ions from the corona electrode to the additional electrode, such as to generate an ion wind which flows from the corona electrode and into the suction channel, through the inflow orifice thereof located in the close proximity of the corona electrode. Since this airflow is driven by the air ions which migrate from the corona electrode to the target electrode, the airflow will pass very close to the corona electrode, and it is found possible when proceeding in this manner, to transport into the suction channel practically all of the deleterious or harmful substances generated by the corona discharge on the corona electrode, such that only a negligible or a very small proportion of these substances will disperse directly to the surrounding atmosphere. It is also found that the additional electrode placed in the suction channel, or adjacent its inflow orifice, will eliminate the problem relating to the screening or disturbing effect that the suction channel has on the corona electrode. Instead, it has been found that the additional electrode will function as an excitation electrode which facilitates and promotes the generation of the corona discharge on the corona electrode, such that a more effective and stabler corona discharge can be obtained with the said of a smaller potential difference and/or a greater distance between the corona electrode and the target electrode.

This will afford significant advantages in many instances. It is true that, in this case, there is generated a larger corona current in total, which results in the production of larger quantities of harmful substances, but since these substances are removed effectively by means of the inventive arrangement, this constitutes no disadvantage. Thus, since the inventive arrangement is operative to eliminate the screening effect of the suction channel on the corona electrode, the inflow orifice of the suction channel can be located very close to the corona electrode to no detriment, which further enhances the efficiency of the arrangement.

BRIEF DESCRIPTION OF DRAWING

The inventive arrangement may be given many different forms in practice, as will be understood from the following description of a number of exemplifying embodiments thereof, made with reference to the accompanying schematic drawings, in which

FIG. 2B shows an end view of a portion thereof wind;

DETAILED DESCRIPTION OF PREFERRED EMBODIMENTS

Figure 1:
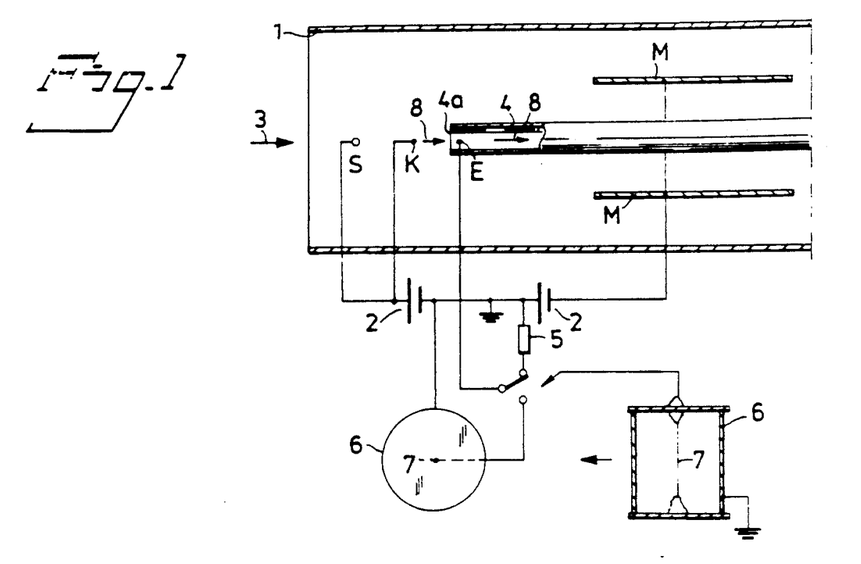
FIG. 1 illustrates a first embodiment of the invention incorporated in an arrangement intended for the transportation of air with the said of ion wind.

FIG. 1 illustrates schematically and in axial section an exemplifying arrangement which, with the said of ion wind, is intended to drive an air flow through an air duct 1, which in the illustrated case is assumed to have a rectangular cross-section. The arrangement includes, in a known manner, a corona electrode K in the form of a wire which extends transversely across the duct 1 in its central plane, and a target electrode M in the form of two, flat plate-like electrode elements which extend in mutual parallel relationship in the longitudinal direction of the duct 1. The corona electrode K and the target electrode M are each connected to a respective pole of a d.c. voltage source 2 which has an intermediate, earthed tapping point, so that the corona electrode K and the target electrode M will have electrical potentials of mutually different polarities in relation to earth. Such an arrangement will have significance in practice, since it will reduce the maximum high-voltage potential of the arrangement in relation to earth. There occurs at the corona electrode K a corona discharge that gives rise to electrically charged air ions which migrate to the target electrode M, at which the ions surrender their electrical charge. This ion migration is operative to drive an air flow, so-called ion wind, through the duct 1 in the direction indicated by the arrow 3, in a manner known from, for instance, the international patent applications recited in the introduction. The arrangement may also include, in a known manner, an elongated screening electrode S, which is disposed parallel with and upstream of the corona electrode and which is connected to the same potential as said electrode. The presence of the screening electrode will prevent ion-migration, and therewith undesirable ion-wind, in an upstream direction from the corona electrode K.

For the purpose of removing and rendering safe harmful substances which are generated adjacent the corona electrode K by a corona discharge thereon, there is provided a suction channel or tube 4 which extends axially within the airflow duct 1 and which has an opening or orifice 4a located immediately downstream of and facing towards the corona electrode K. The suction channel 4 is configured so that the orifice 4a thereof facing the corona electrode K has an extension which corresponds to the extention of the corona electrode K. Arranged within the suction channel 4, or at a location adjacent the inflow orifice 4a thereof, is an additional electrode E, the extension of which preferably corresponds to the extension of the corona electrode K and which is connected to a potential which, in relation to the potential of the corona electrode K, has the same polarity as the target electrode M. The additional electrode E of the illustrated embodiment is connected to earth. It will be understood that although it is practical to connect the additional electrode E to earth from the aspect of controlling the strength of the current applied to said electrode, such connection is not absolutely necessary. As a result of the presence of the additional electrode E, a proportion of the air ions generated by the corona discharge on the corona electrode K will migrate to the additional electrode and therewith generate an ion wind which flows from the corona electrode K to the additional electrode E and into the suction channel 4. The airflow 8 created by this ion wind will pass immediately adjacent the corona electrode K and into the suction channel 4, through its inflow orifice 4a, whereby practically all of the harmful substances generated in the immediate vicinity of the corona electrode K will be removed therefrom and carried through the suction channel or suction tube 4. These harmful substances are conducted through the channel 4 either to an air filtering device, e.g. a carbon filter in which the harmful substances are extracted chemically from the contaminated airflow, or to a location in which the contaminated air can be released safely, e.g. to free atmosphere externally of the building housing the arrangement, as described in the earlier mentioned international patent application PCT/SE87/00183. It has been found that the aforesaid harmful substances can be removed very effectively when proceeding in this manner, and are prevented from spreading to the airflow 3 passing through the duct 1. The presence of the additional electrode E in the suction channel 4 is also operative to reduce the screening or disturbing effect of the suction channel 4 on the corona electrode K. In fact, the additional electrode E may well have an excitation effect on the corona discharge, so as to enable this discharge to be sustained with a smaller potential difference or with a greater distance between the corona electrode K and the target electrode M.

For the purpose of adapting the strength of the corona current delivered to the additional electrode E, partly in terms of absolute values and partly in relation to the size of the corona current delivered to the target electrode, and also for the purpose of adjusting the potential of the additional electrode E to appropriate values, the additional electrode E may be connected to the voltage source 2 or to earth as in the case of the illustrated embodiment, through a resistor 5 of suitably adapted resistance. However, in view of the large potential differences, in the order of 10kV, and the small corona currents, in the order of 10μA, which are entailed, it may be necessary to use resistors of such large resistance values as to exclude the possibility of acquiring in practice resistors such as those whose resistance values can be adapted with the precision required. Consequently, it may be advantageous to connect the additional electrode E to the voltage source 2 via a resistance in the form of a corona discharge path, as illustrated schematically in FIG. 1 as an alternative embodiment. This "resistance device" comprises a closed container 6 which has a cylindrical form in the illustrated embodiment and which includes an electrically conductive outer cylindrical wall and electrically insulating end walls, and a wire-shaped corona electrode 7, hereinafter referred to as the contained corona electrode, which extends axially within the container. The contained corona-electrode 7 is connected electrically to the additional electrode E, whereas the cylindrical wall of the container 6 is connected to earth. By adapting the size of the container 6, and therewith the distance between the contained, central corona-electrode 7 and the outer wall of the container 6, said outer wall functioning as a contained target-electrode, it is possible to adjust accurately the corona current between the contained corona-electrode 7 and the outer wall of the container 6, and therewith the equally as large current between the corona electrode K and the additional electrode E. The device 6, 7 thus functions as an accurately adjustable, large resistor for determining the corona current from the corona electrode K to the additional electrode E, and also the potential of the additional electrode E. The container 6 may be sealed hermetically, such as to prevent the harmful substances generated by the corona discharge on the contained corona-electrode 7 from escaping to the surroundings. It will be understood that in practice, of course, the inventive arrangement need not necessarily be provided with both a resistor 5 and the resistive device 6, 7, and that the inclusion in FIG. 1 of both the resistor 5 and the device 6, 7 as a means of connecting the additional electrode E to the voltage source 2 has been done merely in order to illustrate two possibilities that are available in this regard.

Figure 2:
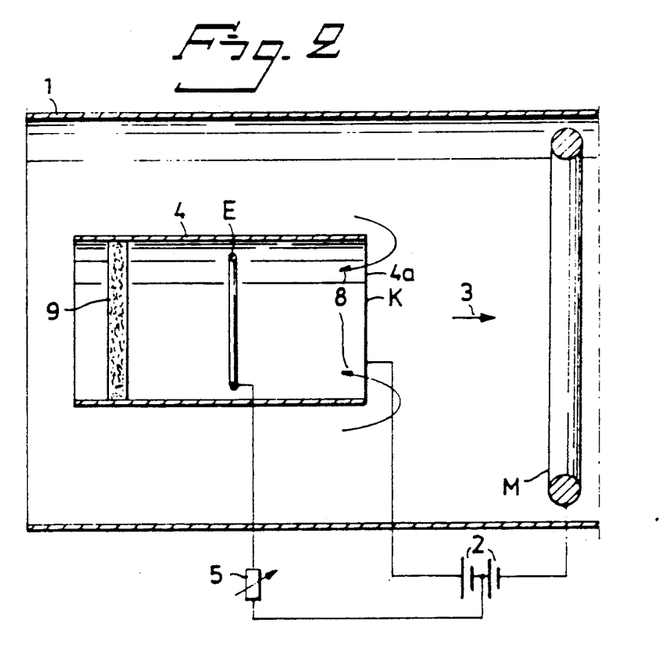
FIG. 2 illustrates a second embodiment of the invention incorporated in an arrangement intended for the transportation of air with the said of ion.
Figure 2A:
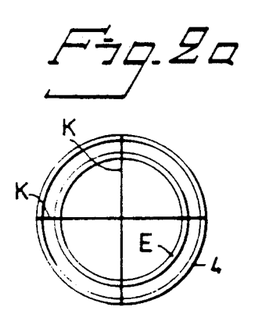

FIG. 2 illustrates an arrangement for driving an airflow through a duct 1 of circular cross-section with the said of an ion wind. The arrangement includes, in a known and previously described manner, a corona electrode K and a target electrode M which are spaced axially from one another in the duct 1 and each of which is connected to a respective pole of a d.c. voltage source 2. The target electrode M of the FIG. 2 embodiment is ring-shaped, whereas the corona electrode K comprises two wire-like electrodes which intersect to form a cross, as is best seen from FIG. 2A. The two electrode elements of the corona electrode K are attached directly to the open end 4a of a suction channel or tube 4 of round cross-section, such as to extend across said open end 4a. The additional electrode E of this embodiment is also ring-shaped and is arranged within the suction channel 4, which extends in the upstream direction, and is connected to earth in the manner before described. The ion flow from the corona electrode K to the additional electrode E gives rise to an ion wind which generates an airflow through the open end 4a of the channel 4, in the manner indicated schematically by arrows 8, and therewith past the corona electrode K, so that the harmful substances generated in the immediate vicinity of the corona electrode K are drawn by suction into the channel 4. As illustrated schematically in the Figure, the channel may have mounted therein a carbon filter 9 which is capable of extracting the harmful substances carried by the air flowing through the channel 4. Naturally, the ion flow from the corona electrode K to the main target electrode M maintains, at the same time, a flow of air which is driven by the ion wind through the duct 1 in the direction of the arrow 3.

The additional electrode E and the main target electrode M of the arrangement according to FIG. 2 are located on mutually opposite sides of the corona electrode K, and consequently it is possible to obtain a very powerful and highly stable corona discharge on the corona electrode K, even when the potential difference between the corona electrode K and the main target electrode M is comparatively moderate and/or when the distance between said electrodes is relatively large.

Figure 3:
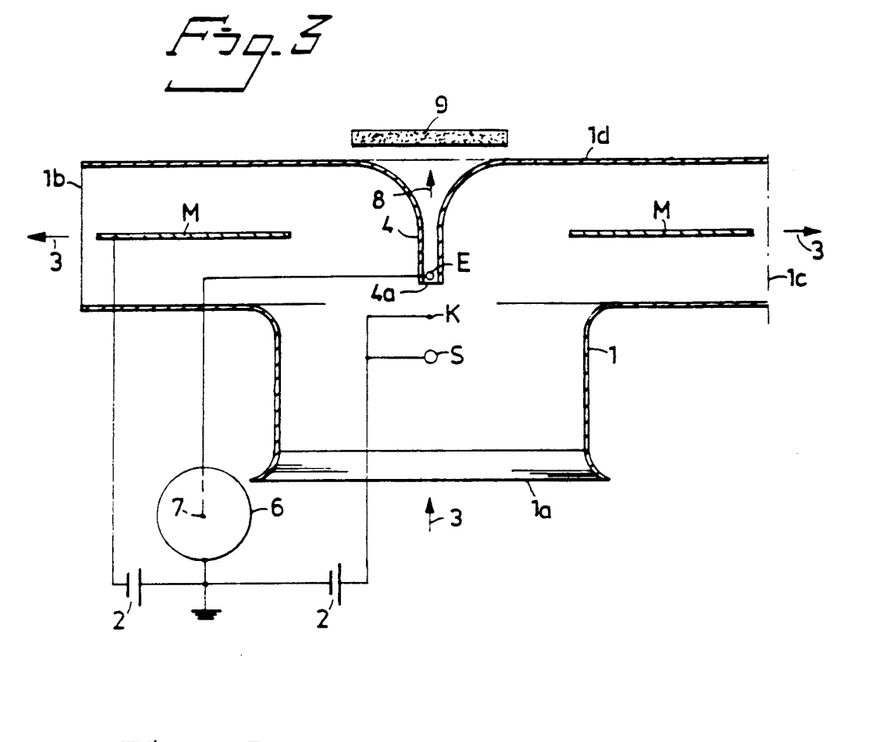
FIG. 3 illustrates a third embodiment of the invention incorporated in an arrangement for the transportation of air with the said of ion wind.

FIG. 3 illustrates schematically and in section an air transportation arrangement which operates with ion wind and which has the general construction described and illustrated in international patent application PCT/SE88/00365 (FIG. 6, 7). The housing or airflow duct 1 in which the arrangement is accommodated is rectangular in the plane perpendicular to the plane of the drawing and has a central inflow opening 1a for the airflow 3 generated by the ion wind, and two mutually opposing outflow openings, referenced 1b, which extend substantially at right angles to the inflow opening 1a. The wire-like corona electrode K, the two plate-like target electrodes M and the screening electrode S are arranged and connected to the d.c. voltage source 2 in the manner described in the aforesaid international patent application and give rise to an airflow 3 through the housing 1 of said arrangement in a manner similar to that described in the specification of said international application. For the purpose of extracting harmful substances generated in the vicinity of the corona electrode K, the rear wall 1d of the housing 1 has formed therein a suction channel 4 which is located axially opposite the corona electrode K. Mounted in the suction channel 4, or at a location adjacent the open end 4a thereof, is an additional electrode E which is connected to earth via a resistance in the form of a corona discharge device 6, 7, in the manner aforedescribed. The air carrying the harmful substances and flowing through the suction channel 4 is caused to pass through a sorbent, e.g. a carbon filter 9, which adsorbs/absorbs the harmful substances, as illustrated schematically in the drawing In the case of an air transportation arrangement of this configuration, the corona electrode K can be positioned very close to the open end 4a of the suction channel 4, without obstructing the "free view" from the corona electrode K to the target electrodes M.

Figure 4:
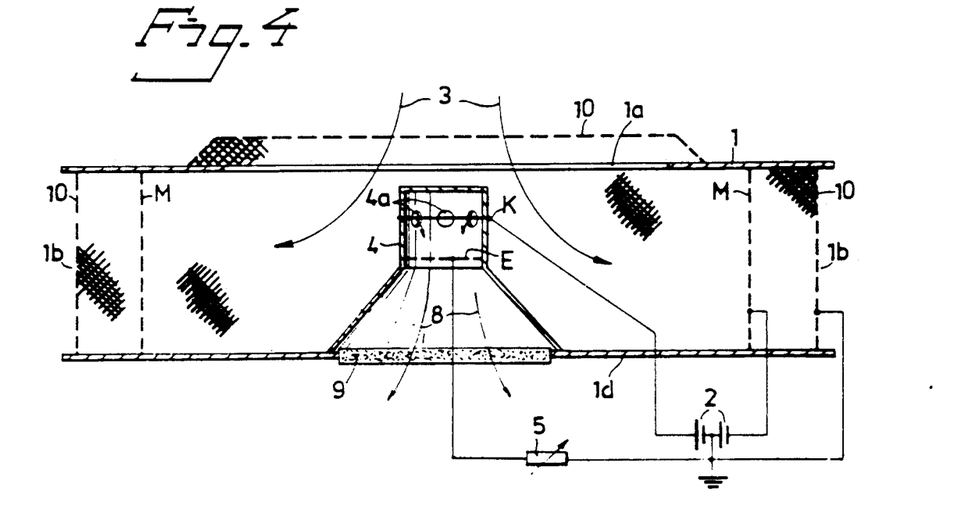
FIG. 4 illustrates a fourth embodiment of the invention incorporated in an arrangement for the transportation of air with the said of ion wind.

FIG. 4 illustrates schematically and in longitudinal section a similar air transportation arrangement which operates with an ion wind. In this case, however, the housing 1 accommodating the arrangement has a cylindrical configuration in the plane extending perpendicularly to the plane of the Figure, such as to provide a circular-symmetrical arrangement. One wall of the housing thus has provided therein a circular inflow opening 1a, and a peripheral, annular outlet opening 1b through which the airflow 3 generated by the ion wind exits. The target electrode M comprises a cylindrical net or grid which is mounted between the front wall and the rear wall 1d of the housing 1. The suction channel 4 formed centrally in the rear wall 1d and having a circular cross-section has a closed axial end in this particular case and, the cylindrical wall of said channel is, instead, provided with a plurality of openings 4a. Extending across the openings 4a is a wire-like corona electrode K, which encircles the suction channel 4. The additional electrode E has the form of a net or grid disposed within the channel 4, such that the corona current from the corona electrode K to the additional electrode E will give rise to an airflow 8 which is driven by an ion wind and which passes through the openings 4a and therewith in close relationship with the corona electrode K. Similar to the manner aforedescribed the suction channel 4 may include an outlet which incorporates a carbon filter 9 for extraction of harmful substances from the airflow 8. At the same time, the corona current from the corona electrode K to the main target electrode M is operative to drive the airflow 3 through the arrangement in a known manner. The inlet opening 1a and the outlet opening 1b of the arrangement are covered with an earthed net or grid 10, which serve as a guard against inadvertent body contact with the high-voltage corona and target electrodes K and M respectively.

Figure 5:
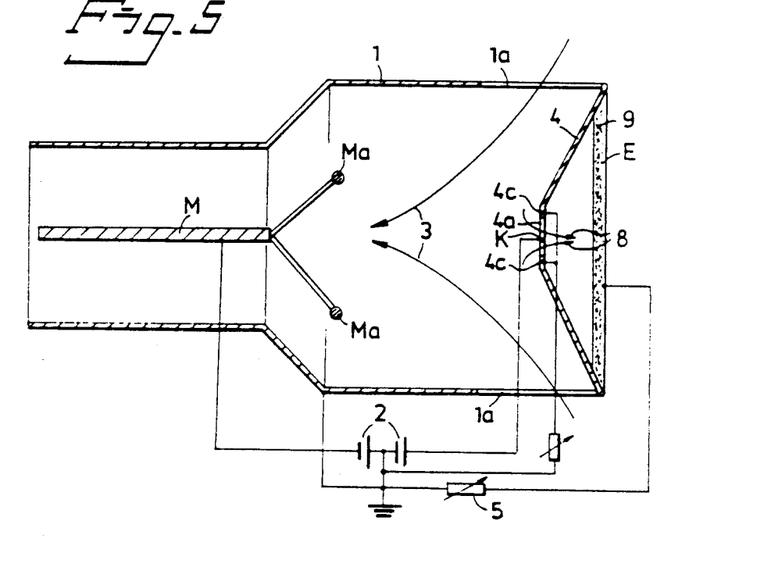
FIG. 5 illustrates a fifth embodiment of the invention incorporated in an arrangement for the transportation of air with the said of ion wind.

FIG. 5 illustrates schematically and in axial section a further embodiment of an ion-wind driven air-transportation arrangement. In this case, the airflow duct 1 has a rectangular cross-section and includes two inlet openings 1a through which airflow 3 generated by an ion wind enters the duct 1. The target electrode M comprises a flat plate, which is positioned centrally in the duct 1 such as to be parallel with the longitudinal extension of said duct, and further comprises two elongated rods Ma. The rods Ma extend in the upstream direction of the plate, parallel with said plate. The corona electrode K has the form of an elongated wire and is mounted in the inflow opening or orifice 4a of the suction channel 4. The outlet end of the suction channel 4 is covered with a carbon filter 9, for the extraction of harmful substances from the air flowing therethrough. The carbon filter 9 of this embodiment is also intended to function as an additional electrode E, which draws current flow from the corona electrode K, so as to create the ion wind which drives the airflow 8 through the opening 4a and past the corona electrode K. In order to prevent a build-up of static electricity in that part 4c of the channel wall located nearest the corona electrode K and the inflow opening 4a, such build-up having a screening or disturbing influence on the corona discharge, said wall part 4c may be made electrically conductive or semi-conductive and connected to earth or to the additional electrode E through a large resistance.

Figure 6:
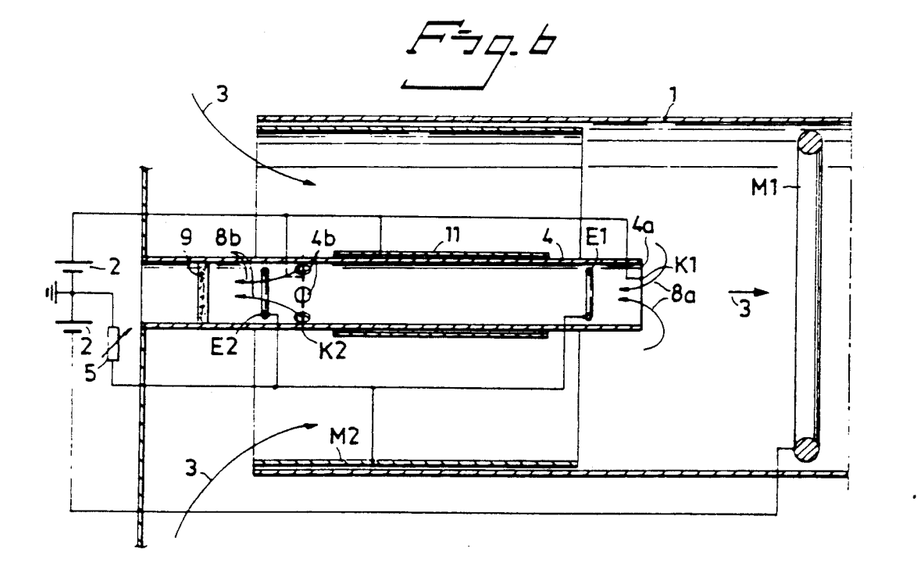
FIG. 6 illustrates a sixth embodiment of the invention incorporated in an arrangement intended for the transportation of air with the said of ion wind and simultaneous cleansing of said air.

FIG. 6 illustrates schematically and in axial section an arrangement for transporting air with the said of an ion wind, while simultaneously cleansing the air transported through the arrangement. The arrangement includes an airflow duct 1 of circular cross-section Mounted in the duct 1 is a first corona discharge device which is operative to generate an ion wind for driving the airflow 3 through the channel 1. This first corona discharge device is constructed principally in the same manner as the device described in the aforegoing with reference to FIG. 2, and thus includes a ring-shaped target electrode M1, a corona electrode K1, in the form of two mutually crossing wires arranged over the open end 4a of the suction tube or channel 4, and a ring-shaped additional electrode E1 which is mounted within the suction channel 4, for the purpose of generating the airflow 8a in through the open end 4a of the suction channel and past the corona electrode K1.

The FIG. 6 embodiment of the inventive arrangement also includes a second corona discharge device which is not intended for driving the airflow 3 through the channel 1, but solely to ionize the airflow so as to enable aerosol contaminants in the airflow to be charged electrically and therewith enable said contaminants to be extracted from said airflow in a capacitor separator. This second corona discharge device includes a wirelike corona-electrode K2 which is ring-shaped and encircles the suction channel 4 in the vicinity of the inlet end of the duct 1, and a cylindrical, target-electrode M2 which is located closely adjacent the inner surface of the wall of said duct 1 or which may optionally have the form of a coating applied to said inner surface. This second corona discharge device is operative to generate an ion current which flows from the corona electrode K2 to the target electrode M2. This ion current charges the aerosol contaminants in the airflow 3 electrically, with a polarity corresponding to the polarity of the corona electrode K2. These electrically-charged impurities or contaminants are separated from the airflow 3 and precipitate onto the target electrode M2, under the influence of the electric field prevailing between the target electrode M2 and a further, cylindrical electrode 11 mounted adjacent to or on the outside of the suction channel or suction tube 4 and connected to a potential of opposite polarity in relation to the potential of the target electrode M2. The target electrode M2 and the electrode 11 thus form together a so-called electrostatic capacitor separator for extraction of the impurities carried by the airflow 3.

For the purpose of removing the deleterious or harmful substances generated by the corona discharge on the corona electrode K2, the wall of the suction channel 4 is provided with a plurality of openings 4b, across which the corona electrode K2 is extending. Also mounted in the suction channel 4 is a further, ring-shaped additional electrode E2 which is operative to draw corona current from the corona electrode K2, such as to generate an ion wind for driving an airflow 8b through the openings 4b and past the corona electrode K2. The harmful substances generated by the corona discharges on the two corona electrodes K1 and K2 are thus drawn by suction into the suction channel 4, through respective openings 4a and 4b, and are thereby prevented from entering the airflow 3 passing through the duct 1. The harmful substances can be removed from the air drawn through the suction channel 4, by means of a carbon filter 9 mounted in said channel, in the aforedescribed manner.

Figure 7:
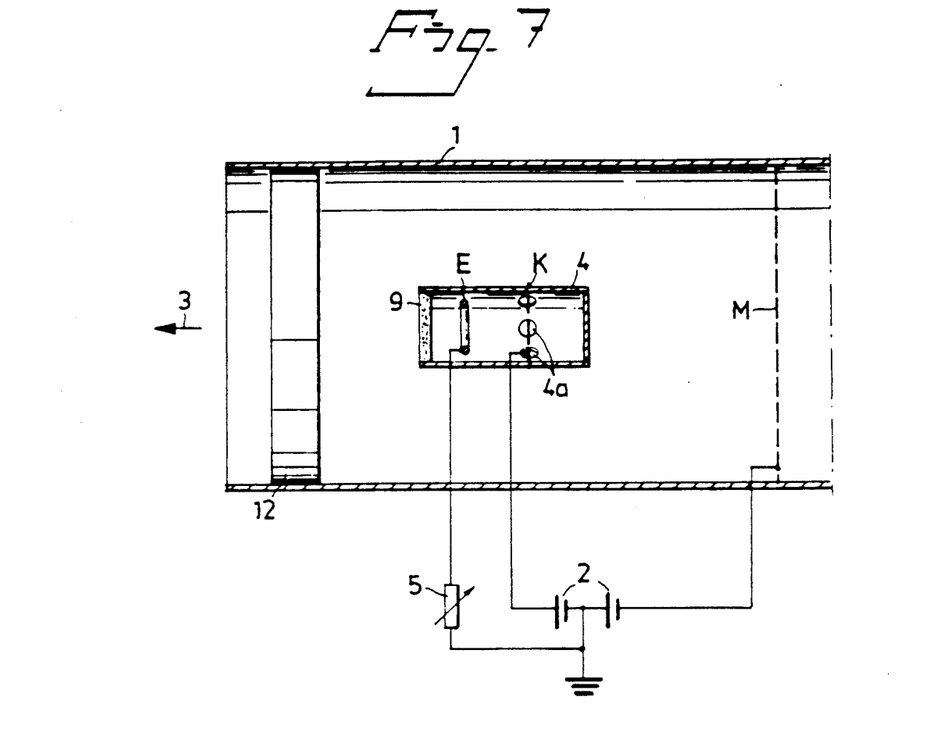
FIG. 7 illustrates a seventh embodiment of the invention incorporated in a corona discharge arrangement intended for producing electrically charged air ions in an air flow which is driven by means of fan.

FIG. 7 illustrates schematically a corona discharge device for ionizing an airflow 3 which is driven through an airflow duct 1 by means of a fan 12 or some corresponding device This corona discharge device includes a target electrode M which has the form of a net or grid extending transversely across the duct 1, and further includes a wire-like, ring-shaped corona electrode K which encircles a suction channel or suction tube 4 extending centrally and axially in the duct 1. The end of the channel 4 facing towards the target electrode M is closed, and the cylindrical wall of the channel is provided, instead, with a plurality of openings 4a, over which the corona electrode K extends. In the manner described in the aforegoing, the suction channel 4 includes a ring-shaped additional electrode E, such as to obtain an airflow 8 through the openings 4a, for the removal of the harmful substances generated by the corona discharge on the corona electrode K. These harmful substances are extracted from the airflow 8 by means of a carbon filter 9 mounted at the downstream open-end of the suction channel 4. Aerosol contaminants present in the airflow will be charged electrically by the ions migrating from the corona electrode K to the target electrode M, and as a result of this electric charge will be driven by the electric field prevailing between said electrodes back to the target electrode M, i.e. against the direction of airflow, and will precipitate onto the target electrode M. This results in cleansing of the airflow while preventing, at the same time, dirtying of the corona electrode arrangement.

Figure 8:
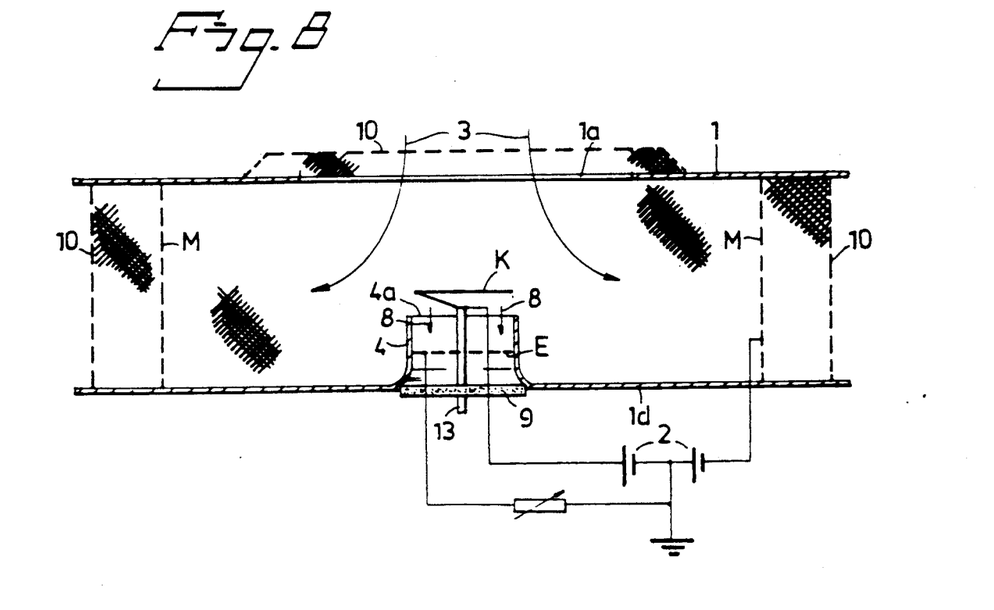
FIG. 8 illustrates an eighth embodiment of the invention incorporated in an arrangement for the transportation of air with the said of ion wind.

FIG. 8 illustrates schematically and in section an air transportation arrangement which operates with ion wind and which is of similar construction to the arrangement described in the aforegoing with reference to FIG. 4, although in this case the corona electrode has a different configuration. In the case of the FIG. 8 embodiment the corona electrode K has the form of a loop of thin wire which is supported by an electrically insulating holder 13. The ring-shaped loop, which functions as the actual corona element per se, is located at some distance upstream of the open end 4a of the suction channel 4. In other respects, the arrangement illustrated in FIG. 8 has essentially the same construction and the same modus operandi as the arrangement illustrated in FIG. 4. It has been found that significant advantages are afforded when the corona electrode K is configured and arranged in the manner illustrated in FIG. 8. One advantage is that the corona electrode K is not in direct contact with the walls of the suction channel 4, which walls may become dirtied with airborne contaminants, which can give rise to difficulties when the corona electrode is in direct contact with such dirtied walls.

It will be understood that the electrically insulated holder 13 supporting the corona electrode K of the FIG. arrangement may alternatively be directed in the other direction, i.e. extend in through the inlet opening 1a of the arrangement. Furthermore, the ring-shaped corona electrode K may comprise a plurality of wirelike elements each extending over solely a part of the periphery of said ring but which together form a complete ring. This electrode construction may be necessary in order to achieve the requisite mechanical stability of a corona electrode K which is made of very fine wire. It will also be understood that a corona electrode K which has the configuration illustrated in FIG. 8 can also be used with many of the inventive embodiments described in the aforegoing, for instance with the embodiments illustrated in FIGS. 2, 6 and 7.

It will be understood from the aforegoing that the invention can be applied with corona discharge arrangements of the most widely varying designs and intended for many different purposes. When applying the invention in practice, it is relatively easy to adapt by trial and error the strength of the total corona current and its distribution on the main target electrode and the additional electrode respectively, and also the potential on the main target electrode and the additional electrode in relation to the corona electrode, in the corona discharge arrangement applicable, so as to obtain the desired result. It has been found that the corona current from the corona electrode to the additional electrode used for removal of the harmful substances by suction should, in many instances, be equally as large, or in some cases even larger than the corona current from the corona electrode to the main target electrode. Thus, the total corona current from the corona electrode will always be greater, and in many cases twice as great or still greater than in those instances when the invention is not applied. As beforementioned, this will result in an increase in the amount of harmful substances generated by the corona discharge, but since these harmful substances are effectively removed and rendered harmless by means of the inventive arrangement, this increase in the generation of harmful substances will carry no disadvantage.

The airflow used for removing the harmful substances from the vicinity of the corona electrode into the suction channel, which airflow is generated according to the present invention by the corona current or ion flow from the corona electrode to the additional electrode, may when necessary also be assisted by mechanical air transporting means, such as a fan or an air pump, connected to the suction channel.

We claim:

1. An improvement in arrangements for removing harmful gaseous substances that are generated by corona discharge in corona discharge apparatus which includes at least one corona electrode (K), at least one target electrode (M), and a d.c. voltage source (2) which is connected between said corona electrode and said target electrode and which has a voltage such as to produce on the corona electrode a corona discharge which will result in the generation of air ions which migrate from eh corona electrode to the target electrode, said arrangement including a suction channel (4) which is restricted relative to he space (1) containing the corona electrode (K) and the target electrode (M) and which has located in the immediate vicinity of the corona electrode (K) an inflow opening (4a) from said space (1), and said channel (4) is operative to conduct the harmful substances to a device (9) for rendering said substances harmless, or to evacuate said harmful substances from said apparatus, wherein said improvements in arrangements includes at least one additional electrode (E) which is connected to a d.c. potential which, in relation to the potential of the corona electrode (k), has the same plurality as the potential of the target electrode (M) and which is mounted in said suction channel (4), or at a location adjacent to said opening, such that an ion current will flow from the corona electrode (K) to the additional electrode (E) and give to an airflow (8) past the corona electrode (K) and into the suction channel (4) through said channel opening (4a).

2. An improvement according to claim 1, wherein the device (9) mounted in the suction channel (4) comprises a filter element which includes material capable of adsorbing/absorbing harmful substances carried by said airflow.

3. An improvement according to claim 1, wherein the suction channel (4) communicates with an environment, for instance outdoor atmosphere, in which the harmful substances can e released safely.

4. An improvement according to claim 1, wherein the corona electrode (K) comprises one or more wire-like electrode elements which extend across said opening (4a) of the suction channel (4).

5. The improvement according to claim 1 wherein the corona electrode (K) comprises a thin wire-ring which is positioned opposite the suction-channel opening (4a), at a slight distance from said opening, in a planar which is substantially parallel with the plane of said opening.

6. The improvement according to claim 1, wherein the part of the suction channel (4) located nearest the corona electrode (K) has the form of a tube provided with an open end (4a).

7. The improvement according to claim 1, wherein the part of the suction channel (4) located nearest the corona electrode (K) has the form of the tube having a closed end and provided in the cylindrical wall thereof with one or more openings (4a); and in that the corona electrode (K) extends across said openings.

8. The improvement according to claim 1, wherein the part (4c) of the suction-channel wall located nearest the opening (4a) is at least slightly conductive electrically, and is connected to a potential of the same polarity in relation to the corona electrode (K) as the additional electrode (E).

9. The improvement according to claim 2, wherein the filter element (9) also forms the additional electrode (E).

10. The improvement according to claim 1, in which the corona electrode (K) and the target electrode (M) are connected respectively to the positive and negative poles o the d.c. source (2a), and in which the voltage source has an earths intermediate tapping point, wherein the additional electrode (E) is connected to earth potential through a large resistance.

11. The improvement according to claim 10, wherein said resistance is formed by a corona discharge device which includes an airtight chamber (6), the walls of which are at least partially conductive electrically and are earthed; and a contained corona electrode (7) located within the chamber (6) and connected to the additional electrode (E).

12. The improvement according to claim 11, wherein said chamber (6) is cylindrical and has a conductive, earthed cylindrical wall and electrically insulated end walls, and wherein the contained corona electrode (7) comprises a wire-like electrode arranged axially in the chamber.

* * * * *

UNITED STATES PATENT AND TRADEMARK OFFICE
CERTIFICATE OF CORRECTION

PATENT NO. : 5,180,404
DATED : Jan. 19, 1993
INVENTOR(S) : LORETH et al.

Page 1 of 3

It is certified that error appears in the above-identified patent and that said Letters Patent is hereby corrected as shown below:

Column 1, Line 41, delete "said" and insert therefore --aid--;

Column 2, Line 42, delete "said" and insert therefore --aid--;

Column 2, Line 52, delete "said" and insert therefore --aid--

Column 3, Line 24, delete "said" and insert therefore --aid--;

Column 3, Line 28, delete "said" and insert therefore --aid--;

Column 4, Line 33, delete "said" and insert therefore --aid--;

Column 4, Line 36, delete "said" and insert therefore --aid--;

Column 4, Line 37, delete "wind".

Column 4, Line 40, delete "said" and insert therefore --aid--;

Column 4, Line 43, delete "said" and insert therefore --aid--;

Column 4, line 36, change "ion, and FIG. 2B shows an end view of a portion thereof wind;" to --ion wind and FIG.2B shows and end view of a a portion thereof;--.".

UNITED STATES PATENT AND TRADEMARK OFFICE
CERTIFICATE OF CORRECTION

PATENT NO. : 5,180,404
DATED : Jan. 19, 1993
INVENTOR(S) : LORETH et al.

It is certified that error appears in the above-identified patent and that said Letters Patent is hereby corrected as shown below:

Column 4, Line 46, delete "said" and insert therefore --aid--;

Column 4, Line 49, delete "said" and insert therefore --aid--;

Column 4, Line 57, delete "said" and insert therefore --aid--;

Column 4, Line 62, delete "said" and insert therefore --aid--;

Column 7, Line 3, delete "said" and insert therefore --aid--;

Column 11, Line 55, delete "eh" and insert therefore --the--;

Column 11, Line 57, delete "he" and insert therefore --the--;

Column 12, Line 1, delete "plurality" and insert therefore --polarity--;

Column 12, Line 16, delete "e" and insert therefore --be--

UNITED STATES PATENT AND TRADEMARK OFFICE
CERTIFICATE OF CORRECTION

PATENT NO. : 5,180,404

DATED : Jan. 19, 1993

INVENTOR(S) : LORETH et al.

It is certified that error appears in the above-identified patent and that said Letters Patent is hereby corrected as shown below:

Column 12, Line 26, delete "planar" and insert therefore --plane--;

Column 12, Line 50, delete "o" and insert therefore --of--; and

Column 12, Line 51, delete "earths" and insert therefore
--earthed--.

Signed and Sealed this

Fourth Day of January, 1994

Attest:

BRUCE LEHMAN

*Attesting Officer*     *Commissioner of Patents and Trademarks*